(12) United States Patent
Nose et al.

(10) Patent No.: US 11,518,364 B2
(45) Date of Patent: Dec. 6, 2022

(54) ENGINE UNIT AND HYBRID VEHICLE INCLUDING ENGINE UNIT

(71) Applicant: TOYOTA JIDOSHA KABUSHIKI KAISHA, Aichi-ken (JP)

(72) Inventors: Yuki Nose, Nagoya (JP); Masaaki Kobayashi, Seto (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 55 days.

(21) Appl. No.: 17/199,440

(22) Filed: Mar. 12, 2021

(65) Prior Publication Data

US 2021/0316714 A1 Oct. 14, 2021

(30) Foreign Application Priority Data

Apr. 10, 2020 (JP) .............. JP2020-070917

(51) Int. Cl.
*B60W 20/15* (2016.01)
*B60W 10/06* (2006.01)
*B60W 10/08* (2006.01)

(52) U.S. Cl.
CPC ............ *B60W 20/15* (2016.01); *B60W 10/06* (2013.01); *B60W 10/08* (2013.01);
(Continued)

(58) Field of Classification Search
CPC ...... B60W 20/15; B60W 10/06; B60W 10/08; B60W 2510/0623; B60W 2510/0676; B60W 2710/083; B60W 20/16; B60W 20/00; B60K 6/445; B60K 6/00; Y02T 10/62; F02D 41/30
(Continued)

(56) References Cited

U.S. PATENT DOCUMENTS 5,845,492 A    12/1998    Isobe et al.
2007/0180817 A1*    8/2007    Yamashita .............. F02D 41/12
                                                                                        60/285

(Continued)

FOREIGN PATENT DOCUMENTS

JP    H996216 A    4/1997
JP    2004218541 A    8/2004
JP    2004293351 A    10/2004

OTHER PUBLICATIONS

Unpublished U.S. Appl. No. 17/029,043, filed Sep. 23, 2020, 64pp.
Unpublished U.S. Appl. No. 17/060,088, filed Oct. 1, 2020, 57pp.

*Primary Examiner* — Yi-Kai Wang
(74) *Attorney, Agent, or Firm* — Hauptman Ham, LLP (57) ABSTRACT

An engine unit includes: an engine that is able to independently inject fuel into cylinders; a cleaning device that cleans exhaust gas from the engine; and a control device that performs low-temperature starting control for increasing an amount of injected fuel when the engine is started at a low temperature. The control device performs temperature increase control for performing fuel cutoff for some cylinders of the engine and increasing an amount of fuel injected into other cylinders after an increase in an amount of fuel in the low-temperature starting control has reached a first predetermined amount when an increase in temperature of the cleaning device is requested while the low-temperature starting control is being performed.

7 Claims, 5 Drawing Sheets

(52) U.S. Cl.
CPC ............... *B60W 2510/0623* (2013.01); *B60W 2510/0676* (2013.01); *B60W 2710/083* (2013.01)

(58) Field of Classification Search
USPC .......................................................... 701/22
See application file for complete search history.

(56) References Cited

U.S. PATENT DOCUMENTS

| 2018/0010515 A1* | 1/2018 | Kolhouse | F02D 9/04 |
| 2019/0071066 A1* | 3/2019 | Imamura | B60W 20/10 |

\* cited by examiner

ENGINE UNIT AND HYBRID VEHICLE INCLUDING ENGINE UNIT

CROSS-REFERENCE TO RELATED APPLICATION

This application claims priority to Japanese Patent Application No. 2020-070917 filed on Apr. 10, 2020, incorporated herein by reference in its entirety.

BACKGROUND

1. Technical Field

The disclosure relates to an engine unit and a hybrid vehicle including the engine unit

2. Description of Related Art

In the related art, an engine unit that controls an engine such that it is brought into a temperature increase mode when an increase in temperature of a catalyst device that cleans exhaust gas of the engine is required has been proposed as such a type of engine unit (for example, see Japanese Unexamined Patent Application Publication No. 2004-218541 (JP 2004-218541 A)). In the temperature increase mode, the engine is controlled such that an air-fuel ratio of some cylinders becomes richer than a stoichiometric air-fuel ratio and an air-fuel ratio of the other cylinders becomes leaner than the stoichiometric air-fuel ratio.

SUMMARY

As an engine unit including a cleaning device that cleans exhaust gas, there is an engine unit in which, when the temperature of the cleaning device is increased, fuel cutoff can be performed for some cylinders of an engine and an increase in an amount of fuel can performed for other cylinders. In general, when an engine is started at a low temperature, an increase in an amount of fuel is performed in consideration of attachment of fuel to an intake port or a cylinder wall. When an increase in temperature of a cleaning device is requested at the time of low-temperature starting, the increase in the amount of fuel at the time of low-temperature starting and an increase in an amount of fuel due to fuel cutoff of some cylinders may overlap for a cylinder not subjected to fuel cutoff, or fuel attached to a cylinder subjected to fuel cutoff may flow into the cylinder not subjected to fuel cutoff, deteriorating accuracy of an air-fuel ratio.

The disclosure provides an engine unit that can curb deterioration in accuracy of an air-fuel ratio when it is requested to perform fuel cutoff for some cylinders of an engine and to increase a temperature of a cleaning device when the engine is started at a low temperature and a hybrid vehicle including the engine unit.

An engine unit and a hybrid vehicle including the engine unit according to the disclosure employ the following configurations.

According to an aspect of the disclosure, there is provided an engine unit including: an engine that is able to independently inject fuel into cylinders; a cleaning device that cleans exhaust gas from the engine; and a control device that performs low-temperature starting control for increasing an amount of injected fuel when the engine is started at a low temperature. The control device performs temperature increase control for performing fuel cutoff for some cylinders of the engine and increasing an amount of fuel injected into other cylinders after an increase in an amount of fuel in the low-temperature starting control has reached a first predetermined amount when an increase in temperature of the cleaning device is requested while the low-temperature starting control is being performed.

In the engine unit according to the aspect of the disclosure, an amount of injected fuel is increased at the time of low-temperature starting of the engine. When an increase in temperature of the cleaning device is requested while the low-temperature starting control is being performed, the temperature increase control for performing fuel cutoff for some cylinders of the engine and increasing an amount of fuel injected into other cylinders after an increase in an amount of fuel in the low-temperature starting control has reached a first predetermined amount is performed. Accordingly, even when fuel is cut off for some cylinders of the engine at the time of low-temperature starting of the engine and an increase in an amount of fuel at the time of low-temperature starting and an increase in an amount of fuel due to fuel cutoff of some cylinders overlap, it is possible to further curb deterioration in accuracy of an air-fuel ratio in comparison with a case in which fuel cutoff for some cylinders of the engine is performed when the increase in the amount of fuel at the time of low-temperature starting is greater than the first predetermined amount. Here, "some cylinders" may be one cylinder or may be two or more cylinders.

In the engine unit according to the aspect of the disclosure, the control device may change the cylinders subjected to fuel cutoff at predetermined time intervals after the increase in the amount of fuel in the low-temperature starting control has reached a second predetermined amount less than the first predetermined amount as the temperature increase control. With this configuration, it is possible to curb thermal imbalance of the engine. Here, the "predetermined time interval" may be a period in which a predetermined time elapses or may be a period in which the engine rotates a predetermined number of rotations.

In the engine unit according to the aspect of the disclosure, the control device may perform the increase in the amount of fuel injected into the other cylinders in the temperature increase control by gradual change. With this configuration, it is possible to curb deterioration in accuracy of an air-fuel ratio in comparison with a case in which the increase in the amount of fuel is suddenly changed.

According to another aspect of the disclosure, there is provided a hybrid vehicle including: the engine unit according to any one of the aforementioned aspects, that is, basically, an engine unit including an engine that is able to independently inject fuel into cylinders, a cleaning device that cleans exhaust gas from the engine, and a control device that performs low-temperature starting control for increasing an amount of injected fuel when the engine is started at a low temperature. The control device performs temperature increase control for performing fuel cutoff for some cylinders of the engine and increasing an amount of fuel injected into other cylinders after an increase in an amount of fuel in the low-temperature starting control has reached a first predetermined amount when an increase in temperature of the cleaning device is requested while the low-temperature starting control is being performed; and an electric motor that is able to output traveling power, wherein the hybrid vehicle travels using power from the engine unit and power from the electric motor. The control device also controls the electric motor, and the control device performs control such that an output torque from the electric motor increases when the temperature increase control is performed.

Since the hybrid vehicle according to the disclosure includes the engine unit according to any one of the aforementioned aspects, the aforementioned advantages achieved by the engine unit according to the disclosure can be achieved. That is, it is possible to curb deterioration in accuracy of an air-fuel ratio. Since control is performed such that the output torque from the electric motor increases when the temperature increase control is performed, it is possible to compensate for at least a part of a driving force which becomes short due to fuel cutoff of some cylinders of the engine with an increase in output torque from the electric motor. As a result, it is possible to curb a decrease in driving force when fuel cutoff is performed for some cylinders of the engine.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described with reference to examples.

Figure 1:
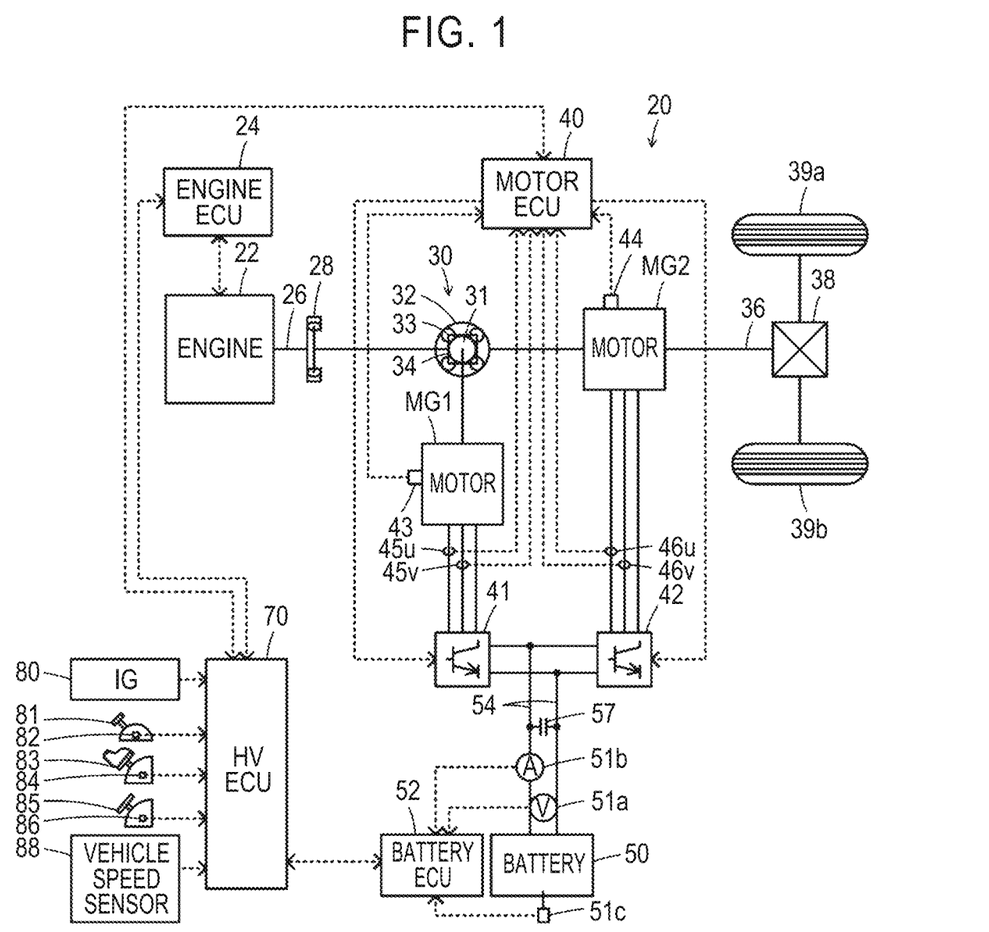
FIG. 1 is a diagram schematically illustrating a configuration of a hybrid vehicle 20 in which an engine unit according to an embodiment of the disclosure is mounted.

FIG. 1 is a diagram schematically illustrating a configuration of a hybrid vehicle 20 in which an engine unit according to an embodiment of the disclosure is mounted. As illustrated in the drawing, the hybrid vehicle 20 according to the embodiment includes an engine 22, an engine ECU 24, a planetary gear 30, motors MG1 and MG2, inverters 41 and 42, a battery 50 serving as a power storage device, and a hybrid electronic control unit (hereinafter referred to as an "HVECU") 70.

Figure 2:
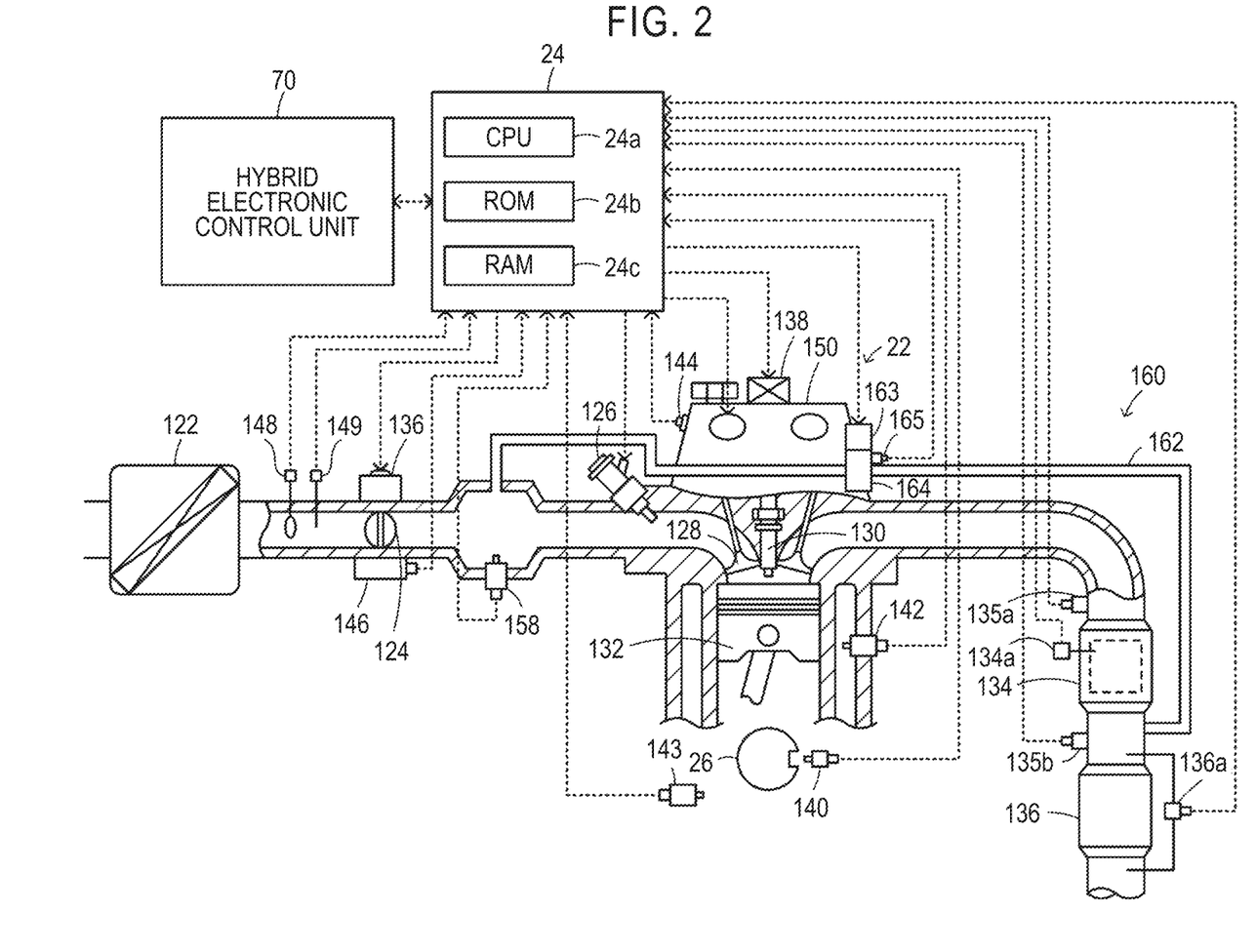
FIG. 2 is a diagram schematically illustrating a configuration of an engine 22.

The engine 22 is configured as a multi-cylinder (for example, four-cylinder or six-cylinder) internal combustion engine that outputs power using gasoline, diesel, or the like as fuel and is connected to a carrier of the planetary gear 30 via a damper 28. FIG. 2 is a diagram schematically illustrating a configuration of the engine 22. As illustrated in the drawing, in the engine 22, air which has been cleaned by an air cleaner 122 is suctioned into an intake passage 123 to pass through a throttle valve 124, fuel is injected from a fuel injection valve 126 provided for each cylinder to mix the fuel and the air, and this mixture gas is suctioned into a combustion chamber 129 via an intake valve 128. The suctioned mixture gas is explosively combusted using an electric spark from an ignition plug 130 provided for each cylinder and a translational motion of a piston 132 which is pressed by energy thereof is converted into a rotational motion of a crank shaft 26. The engine 22 includes the fuel injection valve 126 that injects fuel into each cylinder and thus can perform fuel cutoff for each cylinder. Exhaust gas which is discharged from the combustion chamber 129 to an exhaust passage 133 via an exhaust valve 131 is discharged to the outside air via a catalyst device 134 and a PM filter 136 and is supplied to the intake air side via an exhaust gas recirculation (EGR) device (hereinafter referred to as an "EGR system") 160 that recirculates exhaust gas to intake air. The catalyst device 134 includes a cleaning catalyst (a three-way catalyst) 134a that removes harmful components such as carbon monoxide (CO), hydrocarbon (HC), and nitrogen oxide (NOx) in the exhaust gas. The PM filter 136 is formed as a porous filter out of a ceramic, stainless steel, or the like and captures particulate matter (PM) such as soot in the exhaust gas. In the embodiment, the catalyst device 134 and the PM filter 136 correspond to a "cleaning device." The EGR system 160 includes an EGR passage 162 that is connected to a subsequent stage of the catalyst device 134 and supplies exhaust gas to a surge tank on the intake air side and an EGR valve 164 that is disposed in the EGR passage 162 and is driven by a stepping motor 163. In the EGR system 160, an amount of recirculated exhaust gas which is non-combusted gas is adjusted by adjusting a degree of opening of the EGR valve 164, and the adjusted exhaust gas is recirculated to the intake air side.

The engine ECU 24 is configured as a microprocessor such as a CPU 24a and includes a ROM 24b that stores a processing program, a RAM 24c that temporarily stores data, and input and output ports and a communication port which are not illustrated in addition to the CPU 24a.

Signals from various sensors that detect a state of the engine 22 are input to the engine ECU 24 via the input port. Examples of the signals input to the engine ECU 24 include a crank position from a crank position sensor 140 that detects a rotational position of the crank shaft 26 and an engine coolant temperature Thw from a coolant temperature sensor 142 that detects a temperature of a coolant in the engine 22. Examples of such signals further include an engine oil temperature Thoi from an oil temperature sensor 143 that detects a temperature of an engine oil and a cam position from a cam position sensor 144 that detects a rotational position of a cam shaft opening and closing the intake valve 128 suctioning air into or discharging exhaust gas from a combustion chamber or the exhaust valve. Examples of such signals further include a throttle opening degree TH from a throttle valve position sensor 146 that detects a position of the throttle valve 124, an amount of intake air Qa from an air flowmeter 148 that is attached to an intake passage, an intake air temperature Ta from a temperature sensor 149 that is attached to the intake passage, and an intake air pressure Pin from an intake air pressure sensor 158 that detects a pressure in the intake passage. Examples of such signals further include a catalyst temperature Tc from a temperature sensor 134a that is attached to the catalyst device 134, an air-fuel ratio AF from an air-fuel ratio sensor 135a, an oxygen signal O2 from an oxygen sensor 135b, and a pressure difference ΔP from a pressure difference sensor 136a that detects a pressure difference between in front of and behind the PM filter 136 (a pressure difference between upstream and downstream). Examples of such signals further include an EGR valve opening EV from an EGR valve opening sensor 165 that detects a degree of opening of the EGR valve 164.

Various control signals for controlling operation of the engine 22 are output from the engine ECU 24 via the output port. Examples of the control signals output from the engine ECU 24 include a drive signal for the fuel injection valve 126, a drive signal for a throttle motor 136 that adjusts the position of the throttle valve 124, and a control signal for an ignition coil 138 that is integrated with an igniter. Examples of such control signals further include a control signal for a variable valve timing mechanism 150 that can change an opening/closing timing of the intake valve 128 and a drive signal for the stepping motor 163 that adjusts a degree of opening of the EGR valve 164.

The engine ECU 24 communicates with the HVECU 70, controls the operation of the engine 22 in accordance with a control signal from the HVECU 70, and outputs data associated with the operation state of the engine 22 according to necessity.

The engine ECU 24 calculates a rotation speed Ne of the engine 22 based on the crank angle θcr from the crank position sensor 140 or calculates a temperature (a catalyst temperature) Tc of the cleaning catalyst 134a of the catalyst device 134 based on the coolant temperature Tw from the coolant temperature sensor 142 or the like. The engine ECU 24 calculates a load ratio (a ratio of an air volume actually input in one cycle to a stroke volume in one cycle of the engine 22) KL based on the amount of intake air Qa from the air flowmeter 148 and the rotation speed Ne of the engine 22. The engine ECU 24 calculates a PM deposition amount Qpm which is an amount of particulate matter deposited in the PM filter 136 based on the pressure difference ΔP from the pressure difference sensor 136a or calculates a filter temperature Tf which is the temperature of the PM filter 136 based on the rotation speed Ne of the engine 22 or the load ratio KL.

As illustrated in FIG. 1, the planetary gear 30 is configured as a single pinion type planetary gear mechanism and includes a sun gear 31, a ring gear 32, a plurality of pinion gears 33 that engages with the sun gear 31 and the ring gear 32, and a carrier 34 that supports the plurality of pinion gears 33 such that they can rotate and revolve. A rotor of the motor MG1 is connected to the sun gear 31 of the planetary gear 30. A drive shaft 36 connected to driving wheels 39a and 39b via a differential gear 38 is connected to the ring gear 32 of the planetary gear 30. The crank shaft 26 of the engine 22 is connected to the carrier 34 of the planetary gear 30 via the damper 28 as described above.

The motor MG1 is configured, for example, as a synchronous generator motor and the rotor thereof is connected to the sun gear 31 of the planetary gear 30 as described above. The motor MG2 is configured, for example, as a synchronous generator motor and a rotor thereof is connected to the drive shaft 36. The inverters 41 and 42 are used to drive the motors MG1 and MG2 and are connected to the battery 50 via power lines 54. A smoothing capacitor 57 is attached to the power lines 54. The motors MG1 and MG2 are rotationally driven by causing a motor electronic control unit (hereinafter referred to as a "motor ECU") 40 to control switching of a plurality of switching elements which are not illustrated in the inverters 41 and 42.

Although not illustrated in the drawing, the motor ECU 40 is configured as a microprocessor such as a CPU, and includes a ROM that stores a processing program, a RAM that temporarily stores data, input and output ports, and a communication port in addition to the CPU. Signals from various sensors which are required for controlling the operations of the motors MG1 and MG2, for example, rotational positions θm1 and θm2 from rotational position sensors 43 and 44 that detect rotational positions of the rotors of the motors MG1 and MG2 and phase currents Iu1, Iv1, Iu2, and Iv2 from current sensors 45u, 45v, 46u, and 46v that detect currents flowing in the phases of the motors MG1 and MG2, are input to the motor ECU 40 via the input port. Switching control signals for the plurality of switching elements of the inverters 41 and 42 and the like are output from the motor ECU 40 via the output port. The motor ECU 40 is connected to the HVECU 70 via the communication port. The motor ECU 40 calculates electrical angles θe1 and θe2, angular velocities ωm1 and ωm2, or rotation speeds Nm1 and Nm2 of the motors MG1 and MG2 based on the rotational positions θm1 and θm2 of the rotors of the motors MG1 and MG2 from the rotational position sensors 43 and 44.

The battery 50 is configured, for example, as a lithium-ion secondary battery or a nickel-hydride secondary battery and is connected to the power lines 54. The battery 50 is controlled by a battery electronic control unit (hereinafter referred to as a "battery ECU") 52.

Although not illustrated in the drawing, the battery ECU 52 is configured as a microprocessor such as a CPU, and includes a ROM that stores a processing program, a RAM that temporarily stores data, input and output ports, and a communication port in addition to the CPU. Signals from various sensors which are required for controlling the battery 50 are input to the battery ECU 52 via the input port. Examples of the signals input to the battery ECU 52 include a voltage Vb of the battery 50 from a voltage sensor 51a that is attached between the terminals of the battery 50, a current Ib of the battery 50 from a current sensor 51b that is attached to the output terminal of the battery 50, and a temperature Tb of the battery 50 from a temperature sensor 51c that is attached to the battery 50. The battery ECU 52 is connected to the HVECU 70 via the communication port. The battery ECU 52 calculates a state of charge SOC based on an integrated value of the current Ib of the battery 50 from the current sensor 51b. The state of charge SOC is a ratio of an amount of electric power dischargeable from the battery 50 to the full capacity of the battery 50.

Although not illustrated in the drawing, the HVECU 70 is configured as a microprocessor such as a CPU, and includes a ROM that stores a processing program, a RAM that temporarily stores data, input and output ports, and a communication port in addition to the CPU. Signals from various sensors are input to the HVECU 70 via the input port. Examples of the signals input to the HVECU 70 include an ignition signal from an ignition switch 80 and a shift position SP from a shift position sensor 82 that detects an operation position of a shift lever 81. Examples thereof further include an accelerator operation amount Acc from an accelerator pedal position sensor 84 that detects an amount of depression of an accelerator pedal 83, a brake pedal position BP from a brake pedal position sensor 86 that detects an amount of depression of a brake pedal 85, and a vehicle speed V from a vehicle speed sensor 88. Examples thereof include an atmospheric pressure Pout from an atmospheric pressure sensor 89. As described above, the HVECU 70 is connected to the engine ECU 24, the motor ECU 40, and the battery ECU 52 via the communication port.

The hybrid vehicle 20 having the above-mentioned configuration travels while switching between a hybrid travel mode (HV travel mode) in which the vehicle travels with the engine 22 operating and an electric travel mode (EV travel mode) in which the vehicle travels with the engine 22 stopped (while intermittently operating the engine 22).

In the HV travel mode, basically, the HVECU 70 sets a traveling torque Td* required for traveling (required for the drive shaft 36) based on the accelerator operation amount Acc and the vehicle speed V and calculates a traveling power Pd* required for traveling by multiplying the set traveling torque Td* by the rotation speed Nd of the drive shaft 36 (the rotation speed Nm2 of the motor MG2). Subsequently, the HVECU 70 calculates a target power Pe* of the engine 22 by subtracting required charging/discharging power Pb* (which is positive when electric power is discharged from the battery 50) of the battery 50 from the traveling power Pd*, and sets a target rotation speed Ne* or a target torque Te* of the engine 22 and torque commands Tm1* and Tm2* of the motors MG1 and MG2 such that the calculated target power Pe* is output from the engine 22 and the traveling torque Td* is output to the drive shaft 36. The HVECU 70 transmits the target rotation speed Ne* and the target torque Te* of the engine 22 to the engine ECU 24 and transmits the torque commands Tm1* and Tm2* of the motors MG1 and MG2 to the motor ECU 40. When the target rotation speed Ne* and the target torque Te* of the engine 22 are received, the engine ECU 24 performs operation control of the engine 22 such that the engine 22 is operated based on the target rotation speed Ne* and the target torque Te*. As the operation control of the engine 22, intake air amount control for controlling the degree of opening of the throttle valve 124, fuel injection control for controlling an amount of fuel injected from the fuel injection valve 126, ignition control for controlling an ignition timing of the ignition plug 130, or the like is performed. In the fuel injection control, a value which is obtained by multiplying a basic fuel injection amount Qf based on the rotation speed of the engine 22 and the intake passage pressure by a correction factor based on values from various sensors that detect the state of the engine 22 is set as a target injection amount Qf*, and the fuel injection valve 126 that is provided for each cylinder is controlled such that the fuel injection amount from the fuel injection valve 126 reaches the target injection amount Qf*. When the torque commands Tm1* and Tm2* of the motors MG1 and MG2 are received, the motor ECU 40 performs switching control of a plurality of switching elements of the inverters 41 and 42 such that the motors MG1 and MG2 are driven in accordance with the torque commands Tm1* and Tm2*.

In the EV travel mode, the HVECU 70 sets the traveling torque Td* based on the accelerator operation amount Acc and the vehicle speed V, sets the torque command Tm1* for the motor MG1 to zero, sets the torque command Tm2* for the motor MG2 such that the traveling torque Td* is output to the drive shaft 36, and transmits the torque commands Tm1* and Tm2* for the motors MG1 and MG2 to the motor ECU 40. The control of the inverters 41 and 42 by the motor ECU 40 is the same as described above.

Figure 3:
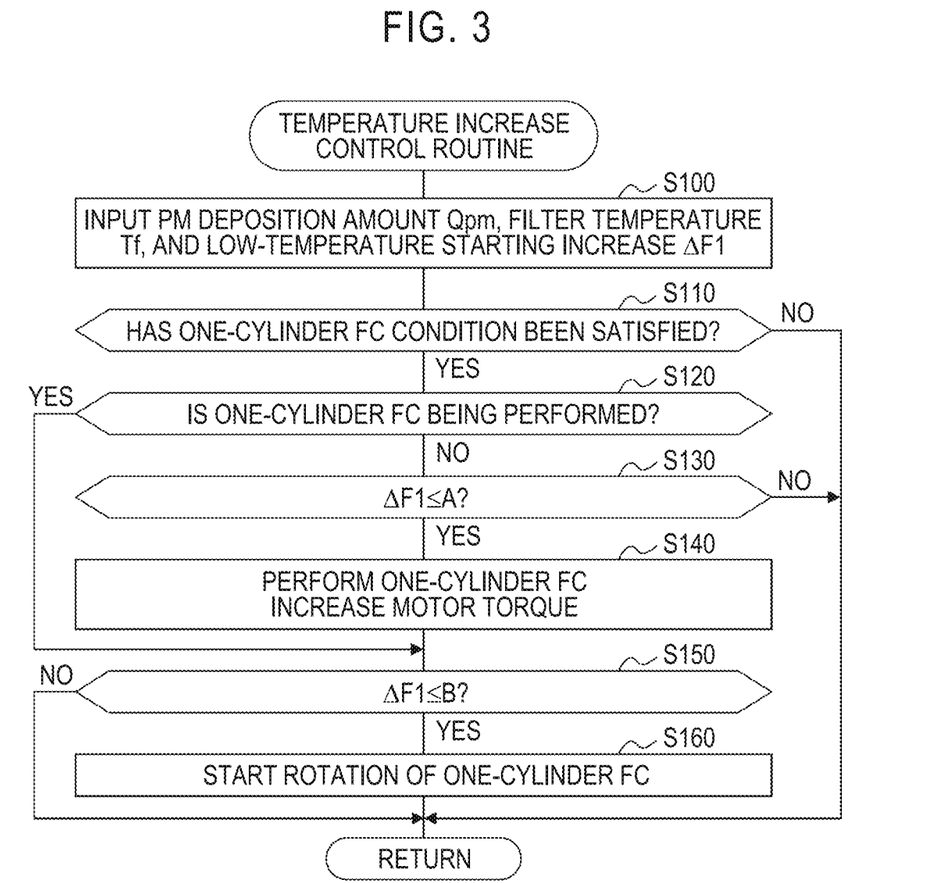
FIG. 3 is a flowchart illustrating an example of a temperature increase control routine which is performed by an engine ECU 24 when the temperature of a PM filter 136 is increased while the engine 22 is being started at a low temperature.

Operations of the hybrid vehicle 20 having the above-mentioned configuration, particularly, operations thereof when the temperature of the catalyst device 134 or the PM filter 136 is increased while the engine 22 is being started at a low temperature, will be described below. In the following description, a case in which the temperature of the PM filter 136 is increased will be described for the purpose of simplification of explanation. Regeneration of the PM filter 136 is performed when the PM deposition amount Qpm which is an amount of deposited particulate matter is equal to or greater than a threshold value Qpmref. Regeneration of the PM filter 136 is performed by increasing the temperature (filter temperature) Tf of the PM filter 136 until the temperature is equal to or higher than a threshold value Tref and then combusting the deposited particulate matter with supply of air to the PM filter 136. Here, the threshold value Qpmref is a lower limit of a PM deposition amount range in which regeneration of the PM filter 136 can be determined to be necessary and, for example, 3 g/L, 4 g/L, or 5 g/L can be used. The threshold value Tfref is a lower limit Tmin of a regenerable temperature range which is suitable for regeneration of the PM filter 136 and, for example, 580° C., 600° C., or 620° C. can be used. In this embodiment, the increase in temperature of the PM filter 136 is performed by performing fuel cutoff for only one cylinder out of the cylinders of the engine 22. Combustion of the particulate matter deposited in the PM filter 136 is performed by performing fuel cutoff for all the cylinders of the engine 22. FIG. 3 is a flowchart illustrating an example of a temperature increase control routine which is performed by the engine ECU 24 when the temperature of the PM filter 136 is increased while the engine 22 is being started at a low temperature. This routine is repeatedly performed at predetermined time intervals.

When the temperature increase control routine is performed, the engine ECU 24 first inputs data such as a PM deposition amount Qpm, a filter temperature Tf, or a low-temperature starting increase ΔF1 (Step S100). Here, values calculated by the engine ECU 24 can be input as the PM deposition amount Qpm and the filter temperature Tf. The low-temperature starting increase ΔF1 is an increase in an amount of injected fuel which is determined by the temperature of a coolant at the time of starting of the engine 22 (a starting coolant temperature), the temperature of the coolant at that time (a current coolant temperature), an integrated amount of air after being started, an engine load ratio, and the like, and a value calculated through fuel injection control can be input.

Subsequently, it is determined whether a one-cylinder fuel cutoff condition has been satisfied (Step S110). That is, it is determined whether the temperature of the PM filter 136 needs to be increased for regeneration of the PM filter 136. Specifically, it is determined whether the PM deposition amount Qpm is equal to or greater than the threshold value Qpmref and whether the filter temperature Tf is lower than the threshold value Tfref. Then, when the PM deposition amount Qpm is less than the threshold value Qpmref, regeneration of the PM filter 136 is not necessary and thus it is determined that the one-cylinder fuel cutoff condition has not been satisfied. When the PM deposition amount Qpm is equal to or greater than the threshold value Qpmref and the filter temperature Tf is lower than the threshold value Tfref, the temperature of the PM filter 136 needs to be increased for regeneration of the PM filter 136, and thus it is determined that the one-cylinder fuel cutoff condition has been satisfied. When the PM deposition amount Qpm is equal to or greater than the threshold value Qpmref and the filter temperature Tf is equal to or higher than the threshold value Tfref, regeneration of the PM filter 136 is necessary but the increase in temperature of the PM filter 136 is not necessary, and thus it is determined that the one-cylinder fuel cutoff condition has not been satisfied. Since it is assumed that the engine 22 is started at a low temperature, it is not necessary to consider a case in which the filter temperature Tf is equal to or higher than the threshold value Tfref. When it is determined in Step S110 that the one-cylinder fuel cutoff condition has not been satisfied, the control routine ends. That is, normal low-temperature starting of the engine 22 is performed without performing the one-cylinder fuel cutoff.

When it is determined in Step S110 that the one-cylinder fuel cutoff condition has been satisfied, it is determined whether one-cylinder fuel cutoff has been already performed (Step S120). Since one-cylinder fuel cutoff has not been performed immediately after the engine 22 has been started at a low temperature, the determination result of Step S120 is negative. In this case, it is determined whether the low-temperature starting increase $\Delta F1$ is equal to or less than a threshold value A (Step S130). When it is determined that the low-temperature starting increase $\Delta F1$ is greater than the threshold value A, the control routine ends without starting execution of one-cylinder fuel cutoff. In this case, normal low-temperature starting of the engine 22 is also performed. The threshold value A can be set to, for example, a value in an increase range of 70% to 120% (1.7 times to 2.2 times of a normal amount of injected fuel).

On the other hand, when it is determined in Step S130 that the low-temperature starting increase $\Delta F1$ is equal to or less than the threshold value A, fuel cutoff for only one cylinder of the cylinders of the engine 22 (one-cylinder fuel cutoff) is performed and the output torque of the motor MG2 is increased (Step S140). When the one-cylinder fuel cutoff is performed, an increase in an amount of fuel is performed for the cylinders not subjected to fuel cutoff (combustion cylinders) out of the cylinders of the engine 22. An increase $\Delta F2$ at this time ranges from 0% to 33% in case of a four-cylinder engine, and ranges from 0% to 20% in case of a six-cylinder engine. The increase in the amount of fuel for the combustion cylinders with the one-cylinder fuel cutoff is preferably performed by gradual change. For example, when the increase $\Delta F$ is 20%, the increase of 20% is achieved in five cycles or seven cycles. An increase of the output torque of the motor MG2 can be preferably used as a driving force corresponding to a decrease in output of the engine 22 due to the one-cylinder fuel cutoff. The increase of the output torque of the motor MG2 is performed by causing the engine ECU 24 to request the HVECU 70 to increase the output torque of the motor MG2 due to the one-cylinder fuel cutoff, causing the HVECU 70 to request the motor ECU 40 to increase the output torque of the motor MG2 based on the request, and causing the motor ECU 40 to increase the output torque of the motor MG2.

Then, it is determined whether the low-temperature starting increase $\Delta F1$ is equal to or less than a threshold value B (Step S150). The threshold value B is a value less than the threshold value A, and can be set to, for example, a value in an increase range of 40% to 80% (1.4 times to 1.8 times the normal amount of injected fuel). When it is determined that the low-temperature starting increase $\Delta F1$ is equal to or less than the threshold value B, rotation of a fuel-cutoff cylinder of sequentially changing the cylinder subjected to fuel cutoff in the cylinders of the engine 22 is started (Step S160), and the control routine ends. The rotation of a fuel-cutoff cylinder is performed by changing the cylinder to be subjected to fuel cutoff at predetermined time intervals. The predetermined time interval may be set to a period in which a predetermined time elapses such as one second or two seconds, may be set to a rotating period corresponding to a predetermined number of rotations such as 25 rotations or 50 rotations, or may be set to a rotating period corresponding to the number of cycles such as 10 cycles or 25 cycles. In this embodiment, a cycle counter C counts up by one for each cycle, and the counter C is reset and the fuel-cutoff cylinder is changed when the counter C reaches a threshold value Cref (for example, 10, 15, 20, or 25). When the fuel-cutoff cylinder is rotated in this way, it is possible to curb thermal imbalance of the engine 22. When it is determined in Step S150 that the low-temperature starting increase $\Delta F1$ is greater than the threshold value B, the control routine ends without starting the rotation of the fuel-cutoff cylinder.

When it is determined in Step S120 that one-cylinder fuel cutoff has been already performed (is being performed), the one-cylinder fuel cutoff has been already performed and thus the control routine proceeds to Step S150 without performing the process of determining starting of the one-cylinder fuel cutoff (Step S130) or the process of starting one-cylinder fuel cutoff (Step S140).

When the temperature Tf of the PM filter 136 becomes equal to or greater than the threshold value Tfref through this temperature increase control, the PM filter 136 is regenerated by supplying air to the PM filter 136 through fuel cutoff for all the cylinders or fuel cutoff for a plurality of cylinders and combusting the deposited particulate matter as described above.

Figure 4:
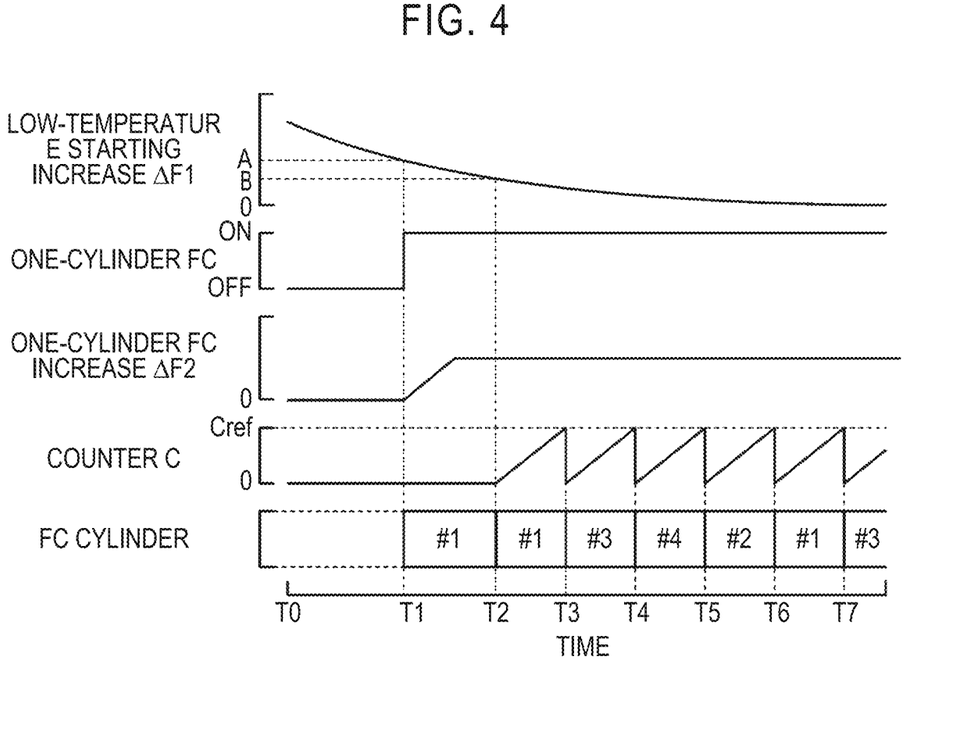
FIG. 4 is a diagram illustrating an example of temporal change of a low-temperature starting increase ΔF1, execution of one-cylinder fuel cutoff, and rotation of a fuel-cutoff cylinder.

FIG. 4 is a diagram illustrating an example of temporal change of the low-temperature starting increase $\Delta F1$, execution of one-cylinder fuel cutoff, and rotation of a fuel-cutoff cylinder. Low-temperature starting of the engine 22 is performed at time T0, and one-cylinder fuel cutoff of cutting off supply of fuel to #1 cylinder is performed when the low-temperature starting increase $\Delta F1$ reaches the threshold value A at time T1. At this time, an increase in an amount of fuel $\Delta F2$ is performed for #2 to #4 cylinders and the increase $\Delta f2$ is performed in several cycles. When the low-temperature starting increase $\Delta F1$ reaches the threshold value B at time T2, rotation of a fuel-cutoff cylinder is started and count-up of the counter C is started. Thereafter, at times T3, T4, T5, . . . at which the counter C reaches the threshold value Cref, the fuel-cutoff cylinder is changed to #3 cylinder, #4 cylinder, #2 cylinder, . . . .

In the engine unit mounted in the hybrid vehicle 20 according to this embodiment, when it is necessary to increase the temperature of the PM filter 136 at the time of low-temperature starting of the engine 22, one-cylinder fuel cutoff is performed after the low-temperature starting increase $\Delta F1$ has reached the threshold value A. Accordingly, even when fuel is cut off for one cylinder of the engine at the time of low-temperature starting of the engine 22 and the low-temperature starting increase $\Delta F1$ and the increase in the amount of fuel $\Delta F2$ due to the one-cylinder fuel cutoff overlap, it is possible to further curb deterioration in accuracy of an air-fuel ratio in comparison with a case in which the one-cylinder fuel cutoff is performed when the low-temperature starting increase $\Delta F1$ is greater than the threshold value A. The increase in the amount of fuel $\Delta F2$ is performed for combustion cylinders not subjected to fuel cutoff with the one-cylinder fuel cutoff, and this increase in the amount of fuel $\Delta F2$ is performed by gradual change, and thus it is possible to curb deterioration in accuracy of the air-fuel ratio.

In the hybrid vehicle 20 according to the embodiment, when one-cylinder fuel cutoff is performed, the output torque of the motor MG2 is increased and thus it is possible to curb a decrease of a driving force due to the one-cylinder fuel cutoff.

In the hybrid vehicle 20 according to the embodiment, fuel cutoff for only one cylinder out of the cylinders of the engine 22 is performed to increase the temperature of the PM filter 136, but fuel cutoff for two or more cylinders out of the cylinders of the engine 22 may be performed. In this case, fuel cutoff may be simultaneously started for a plurality of cylinders, or the number of cylinders subjected to fuel cutoff may be gradually increased. In this case, the increase of the output torque of the motor MG2 is preferable to be a driving force corresponding to the number of cylinders subjected to fuel cutoff.

In the embodiment, the engine 22 is an engine with four cylinders, but the disclosure can be applied to all multi-cylinder engines such as a six-cylinder engine and an eight-cylinder engine.

In the engine unit according to the embodiment, the increase in the amount of fuel ΔF2 in a combustion cylinder not subjected to fuel cutoff with the one-cylinder fuel cutoff is achieved by gradual change, but it may be achieved by sudden change.

In the engine unit according to the embodiment, it is assumed that the temperature of the PM filter 136 is increased, but the same can be applied to a case in which the temperature of the catalyst device 134 is increased.

In the hybrid vehicle 20 according to the embodiment, the battery 50 is used as a power storage device, but a capacitor may be used instead of the battery 50.

Figure 5:
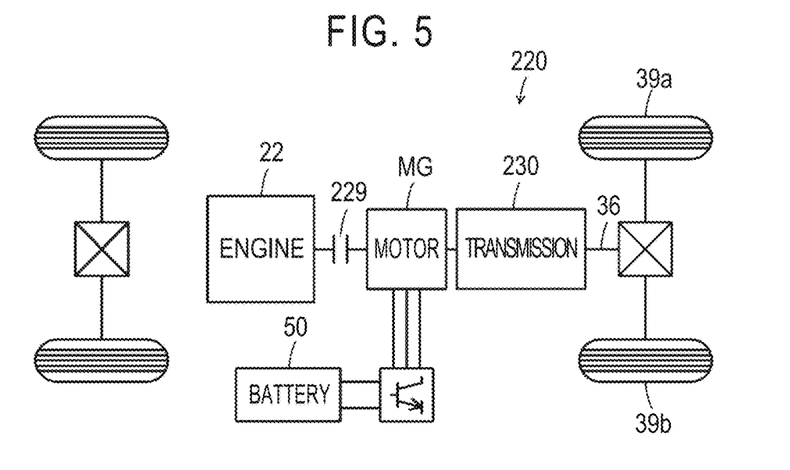
FIG. 5 is a diagram schematically illustrating a configuration of a hybrid vehicle 220 according to a modified example.
Figure 6:
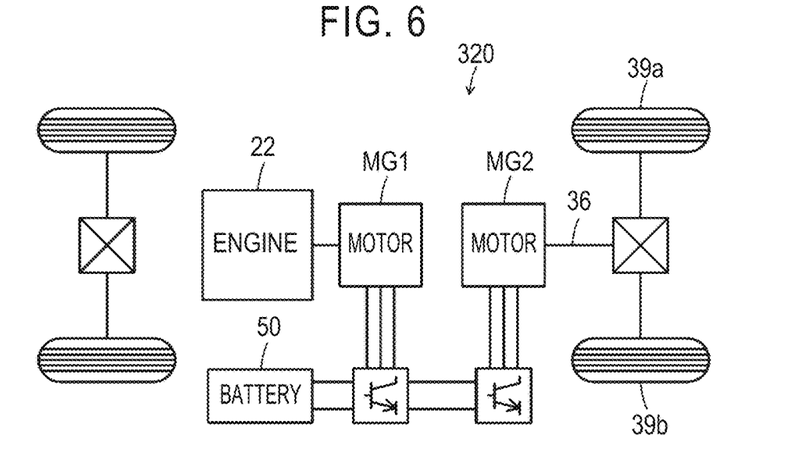
FIG. 6 is a diagram schematically illustrating a configuration of a hybrid vehicle 320 according to a modified example.
Figure 7:
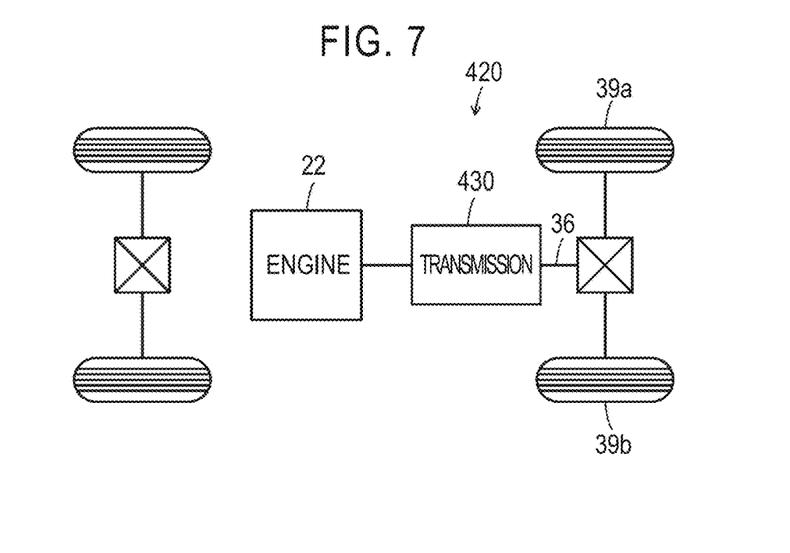
FIG. 7 is a diagram schematically illustrating a configuration of a hybrid vehicle 420 according to a modified example.

In the hybrid vehicle 20 according to the embodiment, a configuration in which the engine 22 and the motor MG1 are connected to the drive shaft 36 connected to the driving wheels 39a and 39b via the planetary gear 30, the motor MG2 is connected to the drive shaft 36, and the battery 50 is connected to the motors MG1 and MG2 via power lines has been employed. However, as can be seen from a hybrid vehicle 220 according to a modified example illustrated in FIG. 5, a configuration of a so-called single-motor hybrid vehicle in which a motor MG is connected to the drive shaft 36 connected to the driving wheels 39a and 39b via a transmission 230, the engine 22 is connected to the motor MG via a clutch 229, and the battery 50 is connected to the motor MG via a power line may be employed. As can be seen from a hybrid vehicle 320 according to a modified example illustrated in FIG. 6, a configuration of a so-called series hybrid vehicle in which a power-generating motor MG1 is connected to the engine 22, a traveling motor MG2 is connected to the drive shaft 36 connected to the driving wheels 39a and 39b, and the battery 50 is connected to the motors MG1 and MG2 via power lines may be employed. As can be seen from a hybrid vehicle 420 according to a modified example illustrated in FIG. 7, a configuration of a so-called gasoline vehicle in which the engine 22 is connected to the drive shaft 36 connected to the driving wheels 39a and 39b via a transmission 430 may be employed.

Correspondence between principal elements of the embodiment and principal elements of the disclosure described in the SUMMARY will be described below. In the embodiment, the engine 22 is an example of an "engine." The catalyst device 134 or the PM filter 136 is an example of a "cleaning device." The engine ECU 24 is an example of a "control device."

The correspondence between the principal elements in the embodiment and the principal elements of the disclosure described in the SUMMARY does not limit the elements of the disclosure described in the SUMMARY, because the embodiment is an example for specifically describing an aspect of the disclosure described in the SUMMARY. That is, it should be noted that the disclosure described in the SUMMARY has to be construed based on the description of the SUMMARY and the embodiment is only a specific example of the disclosure described in the SUMMARY.

While an embodiment of the disclosure has been described above, the disclosure is not limited to the embodiment and can be modified in various forms without departing from the gist of the disclosure.

The disclosure is applicable to the manufacturing industries for engine units and hybrid vehicles.

What is claimed is:

1. An engine unit comprising:
    an engine that is able to independently inject fuel into cylinders;
    a cleaning device that cleans exhaust gas from the engine; and
    a control device that performs low-temperature starting control for increasing an amount of injected fuel when the engine is started at a low temperature, wherein
    the control device performs temperature increase control for performing fuel cutoff for some cylinders of the engine and increasing an amount of fuel injected into other cylinders after an increase in an amount of fuel in the low-temperature starting control has reached a first predetermined amount when an increase in temperature of the cleaning device is requested while the low-temperature starting control is being performed.

2. The engine unit according to claim 1, wherein
    in response to the increase in the amount of fuel in the low-temperature starting control being at or below a second predetermined amount less than the first predetermined amount,
    the control device, as the temperature increase control, sequentially changes the some cylinders subjected to fuel cutoff among the cylinders at predetermined time intervals.

3. The engine unit according to claim 1, wherein
    the control device performs the increase in the amount of fuel injected into the other cylinders in the temperature increase control by gradual change.

4. A hybrid vehicle comprising:
    an engine unit; and
    an electric motor,
    wherein engine unit comprises:
        an engine configured to independently inject fuel into cylinders of the engine;
        a cleaning device configured to clean exhaust gas from the engine; and
        a control device configured to perform low-temperature starting control for increasing an amount of injected fuel when the engine is started at a low temperature,
    wherein, while the low-temperature starting control is being performed,
        in response to (i) an increase in temperature of the cleaning device being requested and (ii) an increase in the amount of injected fuel in the low-temperature starting control being at or below a first predetermined amount,
            the control device is configured to perform temperature increase control for performing fuel cutoff for at least one cylinder of the engine and increasing an amount of fuel injected into other cylinders of the engine,
    wherein the hybrid vehicle is configured to travel using power from the engine unit and power from the electric motor,
    wherein the control device is also configured to control the electric motor, and
    wherein the control device is configured to perform control such that an output torque from the electric motor increases when the temperature increase control is performed.

5. The hybrid engine according to claim 4, wherein
in response to the increase in the amount of injected fuel in the low-temperature starting control being at or below a second predetermined amount less than the first predetermined amount,
the control device, as the temperature increase control, is configured to sequentially change, at predetermined time intervals, the at least one cylinder subjected to fuel cutoff among the cylinders of the engine.

6. The engine unit according to claim 1, wherein
the control device is configured to perform the temperature increase control after the increased amount of fuel in the low-temperature starting control is reduced to or less than the first predetermined amount when the increase in temperature of the cleaning device is requested while the low-temperature starting control is being performed.

7. The engine unit according to claim 1, wherein
the control device is configured to, in response to (i) a particulate matter deposition amount deposited in the cleaning device is equal to or greater than a first threshold value and (ii) a current temperature of the cleaning device is less than a second threshold value, request the increase in temperature of the cleaning device.

\* \* \* \* \*